United States Patent
Qiao et al.

(10) Patent No.: US 12,039,002 B2
(45) Date of Patent: Jul. 16, 2024

(54) PREDICTING MULTIVARIATE TIME SERIES WITH SYSTEMATIC AND RANDOM MISSING VALUES

(71) Applicant: INTERNATIONAL BUSINESS MACHINES CORPORATION, Armonk, NY (US)

(72) Inventors: Mu Qiao, Belmont, CA (US); Yuya Jeremy Ong, San Jose, CA (US); Prithviraj Sen, San Jose, CA (US); Berthold Reinwald, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 840 days.

(21) Appl. No.: 17/130,871

(22) Filed: Dec. 22, 2020

(65) Prior Publication Data
US 2022/0197977 A1    Jun. 23, 2022

(51) Int. Cl.
*G06F 17/18*    (2006.01)
*G06F 18/214*   (2023.01)
(Continued)

(52) U.S. Cl.
CPC .......... *G06F 17/18* (2013.01); *G06F 18/2155* (2023.01); *G06N 3/0442* (2023.01); *G06N 3/084* (2013.01)

(58) Field of Classification Search
CPC ... G06F 17/18; G06F 18/2155; G06N 3/0442; G06N 3/044; G06N 3/045; G06N 3/084
See application file for complete search history.

(56) References Cited

U.S. PATENT DOCUMENTS

| 5,706,401 A | 1/1998 | Tresp |
| 9,349,105 B2 | 5/2016 | Beymer et al. |
(Continued)

FOREIGN PATENT DOCUMENTS

| CN | 104766175 A | 4/2015 |
| CN | 109102103 A | 12/2018 |
(Continued)

OTHER PUBLICATIONS

Suo, Q., et al. "Recurrent Imputation for Multivariate Time Series with Missing Values" IEEE Int'l Conf. on Healthcare Informatics, ICHI (2019) available from <https://ieeexplore.ieee.org/abstract/document/8904638> (Year: 2019).*

(Continued)

*Primary Examiner* — Jay Hann
(74) *Attorney, Agent, or Firm* — Tutunjian & Bitetto, P.C.; Stosch Sabo

(57) ABSTRACT

A computer-implemented method is provided for predicting future data values or target labels of multivariate time series data. The method includes receiving the multivariate time series data having present values, systematic missing values, and random missing values. The method further includes masking the present values, the systematic missing values, and the random missing values using triplet encodings. The method also includes determining time intervals between current missing values, from among the systematic missing values and the random missing values, and immediately preceding ones of the present values. The method additionally includes training, by a computing device, at least one recurrent neural network with the triplet encodings, the time intervals, and multivariate time series data to perform a feedforward pass on the recurrent neural network predicting the future data values or the target labels. A forward impu-
(Continued)

tation is utilized by the computing device to impute any of the current missing values.

18 Claims, 10 Drawing Sheets

(51) Int. Cl.
*G06N 3/0442* (2023.01)
*G06N 3/084* (2023.01)

(56) References Cited

U.S. PATENT DOCUMENTS

| | | | | |
|---|---|---|---|---|
| 10,592,368 | B2* | 3/2020 | Guo | G06F 11/2263 |
| 11,227,209 | B2* | 1/2022 | Singh | G06F 11/008 |
| 2021/0049428 | A1* | 2/2021 | Huang | G06F 18/251 |
| 2022/0068445 | A1* | 3/2022 | Ni | G06N 5/04 |

FOREIGN PATENT DOCUMENTS

| | | |
|---|---|---|
| CN | 109272157 A | 1/2019 |
| CN | 109543237 A | 3/2019 |
| WO | WO2019208998 A1 | 10/2019 |

OTHER PUBLICATIONS

Ma, Q., et al. "End-to-End Incomplete Time-Series Modeling From Linear Memory of Latent Variables" IEEE Transactions on Cybernetics, vol. 50, No. 12, pp. 4908-4920 (Apr. 2019) available from <https://ieeexplore.ieee.org/abstract/document/8685795> (Year: 2019).*

Che, Z., et al. "Recurrent Neural Networks for Multivariate Time Series with Missing Values" Nature Scientific Reports, vol. 8, article No. 6085 (2018) available from <https://www.nature.com/articles/s41598-018-24271-9> (Year: 2018).*

Mell et al. "The NIST Definition of Cloud Computing", NIST Special Publication 800-145, 2011, 7 pages.

* cited by examiner

|     | f632   | f546   | ts                  | f632_delta | f546_delta | f632_mask | f546_mask |
|-----|--------|--------|---------------------|------------|------------|-----------|-----------|
| 141 | 0.0225 | NaN    | 2015-01-06 21:00:00 | 0.0        | 3240.0     | 1         | -1        |
| 142 | NaN    | NaN    | 2015-01-06 22:00:00 | 360.0      | 3600.0     | -1        | 0         |
| 143 | NaN    | NaN    | 2015-01-06 23:00:00 | 720.0      | 3960.0     | -1        | -1        |
| 144 | NaN    | 0.0096 | 2015-01-07 00:00:00 | 1080.0     | 0.0        | 0         | 1         |
| 145 | NaN    | NaN    | 2015-01-07 01:00:00 | 1440.0     | 360.0      | -1        | -1        |
| 146 | NaN    | NaN    | 2015-01-07 02:00:00 | 1800.0     | 720.0      | -1        | -1        |
| 147 | NaN    | NaN    | 2015-01-07 03:00:00 | 2160.0     | 1080.0     | 0         | 0         |
| 148 | NaN    | 0.0296 | 2015-01-07 04:00:00 | 2520.0     | 0.0        | -1        | -1        |
| 149 | NaN    | NaN    | 2015-01-07 05:00:00 | 2880.0     | 360.0      | -1        | -1        |
| 150 | 0.3672 | NaN    | 2015-01-07 06:00:00 | 0.0        | 720.0      | 1         | 0         |
| 151 | NaN    | NaN    | 2015-01-07 07:00:00 | 360.0      | 1080.0     | -1        | -1        |
| 152 | NaN    | 0.1391 | 2015-01-07 08:00:00 | 720.0      | 0.0        | -1        | 1         |
| 153 | NaN    | NaN    | 2015-01-07 09:00:00 | 1080.0     | 360.0      | 0         | -1        |
| 154 | NaN    | NaN    | 2015-01-07 10:00:00 | 1440.0     | 720.0      | -1        | 0         |
| 155 | NaN    | NaN    | 2015-01-07 11:00:00 | 1800.0     | 1080.0     | -1        | -1        |

PREDICTING MULTIVARIATE TIME SERIES WITH SYSTEMATIC AND RANDOM MISSING VALUES

BACKGROUND

The present invention generally relates to information processing, and more particularly to predicting multivariate time series with systematic and random missing values.

Multivariate time series with missing values are common in many applications including, for example, but not limited to: Internet of Things; satellite telemetry; healthcare; and so forth.

Missing data can arise for several reasons including, for example, but not limited to: noise and faulty sensors; restrictions in sampling frequencies; redacted and intentionally removed information; and so forth.

Traditional methods to address missing values include, for example, but are not limited to: omitting missing values; and data imputation. However, these methods do not distinguish different types of missing values. Random missing values are missing due to unknown reasons. Systematic missing values are missing due to a different collecting frequency with respect to a higher frequency.

SUMMARY

According to aspects of the present invention, a computer-implemented method is provided for predicting future data values or target labels of multivariate time series data. The method includes receiving the multivariate time series data having present values, systematic missing values, and random missing values. The method further includes masking the present values, the systematic missing values, and the random missing values using triplet encodings. The method also includes determining time intervals between current missing values, from among the systematic missing values and the random missing values, and immediately preceding ones of the present values. The method additionally includes training, by a computing device, at least one recurrent neural network with the triplet encodings, the time intervals, and multivariate time series data to perform a feedforward pass on the recurrent neural network predicting the future data values or the target labels. A forward imputation is utilized by the computing device to impute any of the current missing values.

According to other aspects of the present invention, a computer program product is provided for predicting future values or target labels of multivariate time series data. The computer program product includes a non-transitory computer readable storage medium having program instructions embodied therewith. The program instructions are executable by a computer to cause the computer to perform a method. The method includes receiving the multivariate time series data having present values, systematic missing values, and random missing values. The method further includes masking the present values, the systematic missing values, and the random missing values using triplet encodings. The method also includes determining time intervals between current missing values, from among the systematic missing values and the random missing values, and immediately preceding ones of the present values. The method additionally includes training, by a computing device, at least one recurrent neural network with the triplet encodings, the time intervals, and multivariate time series data to perform a feedforward pass on the recurrent neural network predicting the future data values or the target labels, where a forward imputation is utilized by the computing device to impute any of the current missing values.

According to yet other aspects of the present invention, a computer processing system is provided for predicting future values or target labels of multivariate time series data. The computer processing system includes a memory device for storing program code. The computer processing system further includes a processor device operatively coupled to the memory device for running the program code to receive the multivariate time series data having present values, systematic missing values, and random missing values. The processor device further runs the program code to mask the present values, the systematic missing values, and the random missing values using triplet encodings. The processor device also runs the program code to determine time intervals between current missing values, from among the systematic missing values and the random missing values, and immediately preceding ones of the present values. The processor device additionally runs the program code to train at least one recurrent neural network with the triplet encodings, the time intervals, and multivariate time series data to perform a feedforward pass on the recurrent neural network predicting the future data values or the target labels. A forward imputation is utilized by the computing device to impute any of the current missing values.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 8 is a block diagram showing an exemplary dataset resulting from masking and time interval (delta) generation, in accordance with an embodiment of the present invention;

DETAILED DESCRIPTION

Embodiments of the present invention are directed to predict multivariate time series with system and random missing values.

Advantageously, embodiments of the present invention can accurately predict future data values of multivariate time series or target labels of multivariate time series and perform an action based on the prediction. In an embodiment, the multivariate time series corresponds to sensor data, and the action involves controlling a hardware based machine in view of random and systematic missing values or the collective values including the random and systematic missing values. Such actions can involve shutting down the machine, putting up an accident guard, slowing down the machine to a more safer operation speed, and so forth. The preceding actions are merely illustrative.

Figure 1:
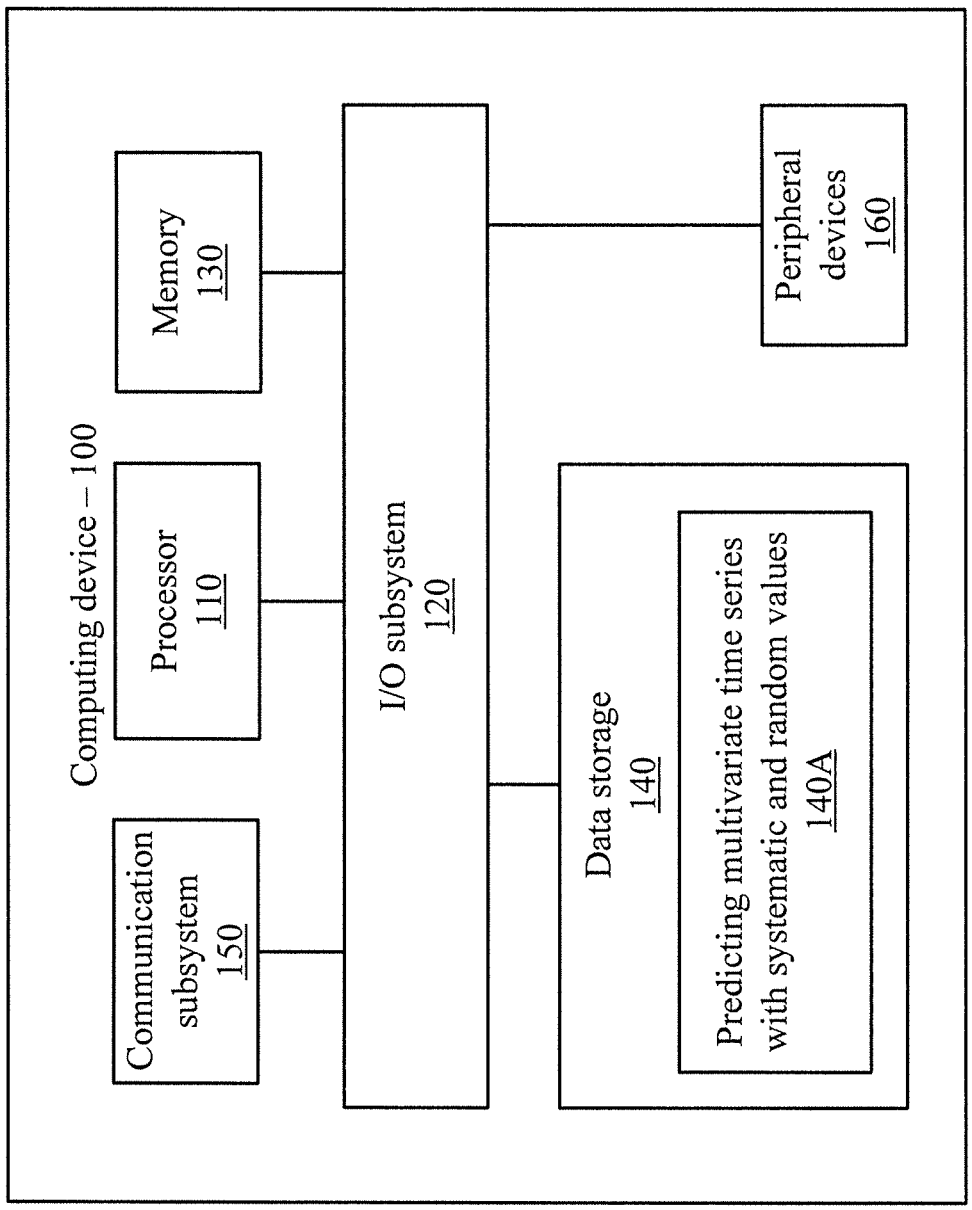
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to predict multivariate time series with systematic and random missing values.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for predicting multivariate time series with systematic and random missing values. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 9-10). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
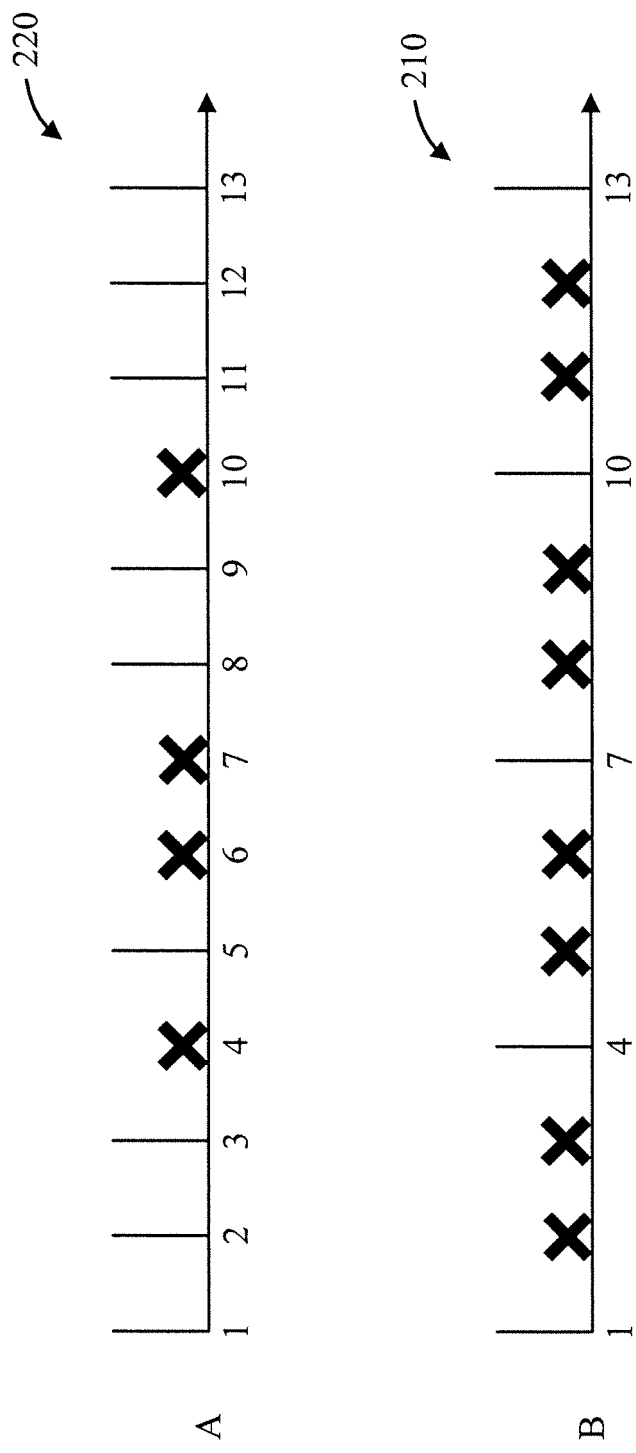
FIG. 2 is a block diagram showing exemplary systematic missing values and random missing values, in accordance with an embodiment of the present invention.

These and other variations of a hardware processor subsystem are also contemplated in accordance with embodiments of the present invention FIG. 2 is a block diagram showing exemplary systematic missing values 210 and random missing values 220, in accordance with an embodiment of the present invention.

Regarding the systematic missing values 210, values 2, 3, 5, 6, 8, 9, 11, and 12 are systematically missing from what should have been 13 consecutive values, as the intended sampling rate is every 1 (1, 2, 3, . . . ), not every $4^{th}$ one (1, 4, 7, 10, and 13).

Regarding the random missing values 220, values 4, 6, 7, and 10 are randomly missing from what should have been 13 consecutive values.

Figure 3:
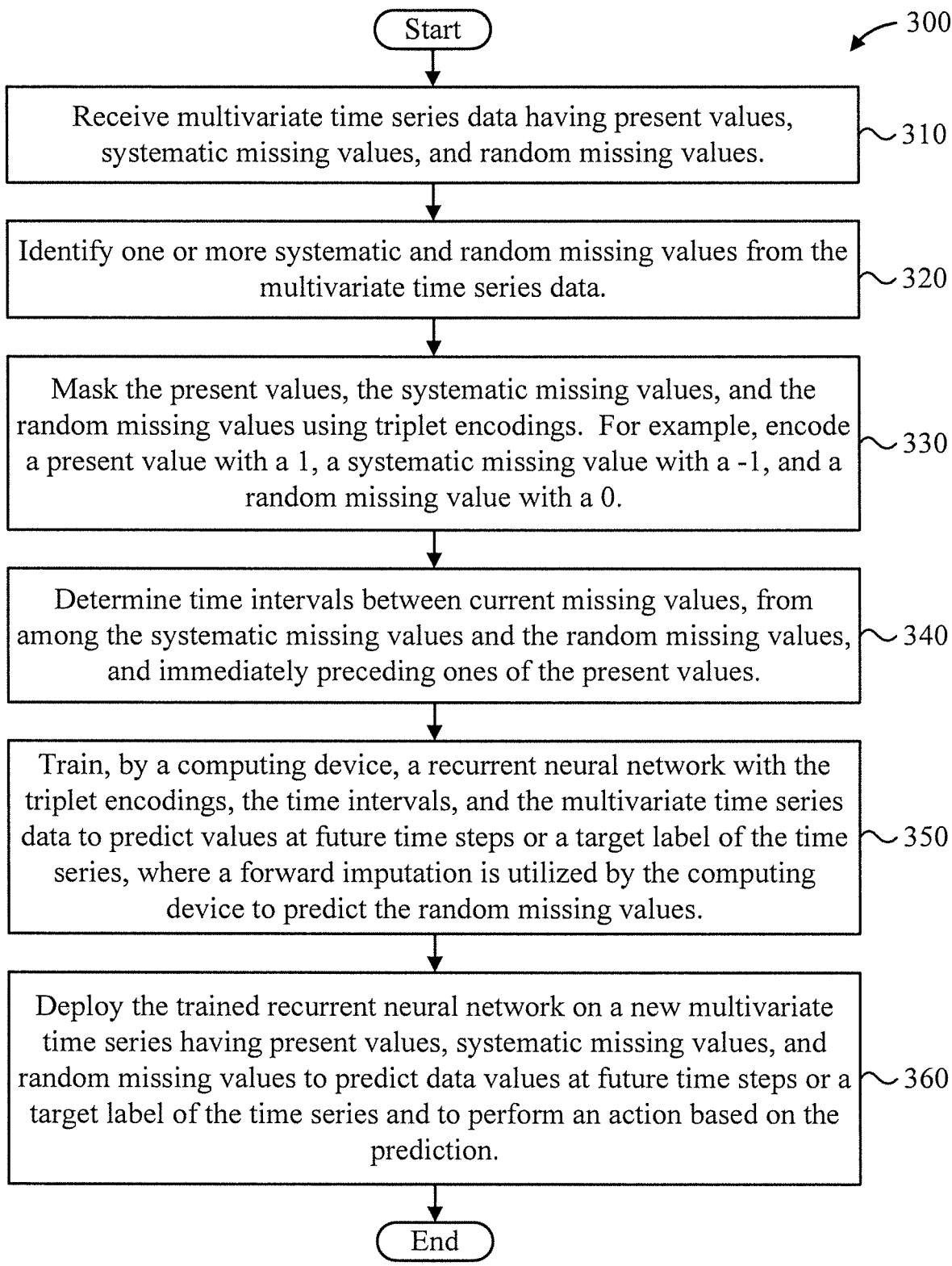
FIG. 3 is a flow diagram showing an exemplary method for predicting multivariate time series data with systematic and random missing values, in accordance with an embodiment of the present invention.

FIG. 3 is a flow diagram showing an exemplary method 300 for predicting multivariate time series data with systematic and random missing values, in accordance with an embodiment of the present invention. In particular, method 300 predicts data values at future time steps or target labels of multivariate time series data with systematic and random missing values.

At block 310, receive multivariate time series data having present values, systematic missing values, and random missing values.

At block 320, identify one or more systematic and random missing values from the multivariate time series data.

At block 330, mask the present values, the systematic missing values, and the random missing values using triplet encodings. For example, encode a present value with a 1, a systematic missing value with a −1, and a random missing value with a 0.

At block 340, determine time intervals between current missing values, from among the systematic missing values and the random missing values, and immediately preceding ones of the present values.

At block 350, train, by a computing device, a recurrent neural network with the triplet encodings, the time intervals, and the multivariate time series data to predict values at future time steps, where a forward imputation is utilized by the computing device to predict the random missing values. The training is performed such that the model takes in the input feature vector, which comprises of the multivariate time series data, the triplet encoding for missing values, and the time interval values, and performs a feedforward pass on the recurrent neural network to generate a prediction. The predicted values from the neural network and the ground truth values are used to compute gradients of the loss function. Model parameters are then updated using the gradient descent and backpropagation method. This training process is repeated until certain criteria is met, such as a user-defined number of training epochs, early stopping by comparing the difference between the loss value of the current epoch and previous one, or any other embodiments. The forward imputation is performed by carrying forward last present values, i.e., using the present value immediately prior to the data that are missing to impute the missing value. The systematic missing values are determined by aligning each of the multivariate time series based on the smallest time granularity of the entire dataset. For example, suppose a variable $v_1$ is collected at every second and a second variable $v_2$ is collected at every other second. After aligning $v_1$ and $v_2$ on the smallest granularity, i.e., every second, the values of $v_2$ at even time steps (e.g., 2, 4, 6, 8, . . . ,) are considered as systematic missing, with respect to $v_1$. In another embodiment, the systematic missing values can be determined by domain knowledge. As an example, a satellite sensor is supposed to transmit one performance metric at every 5 mins. However, due to malfunction or operational errors, the metric is instead transmitted at every 10 mins. The values that are not received at expected time steps are considered as systemic missing. Comparing with random missing, systematic missing follows an expected missing pattern. After the systematic missing values are identified, the remaining missing values are considered as random missing.

At block 360, deploy the trained recurrent neural network on a new multivariate time series having present values, systematic missing values, and random missing values to predict data values at future time steps or a target label of the time series and to perform an action based on the prediction. In an embodiment, the multivariate time series corresponds to sensor data, and the action involves controlling a hardware based machine in view of random missing values or the collective values including the random missing values. Such actions can involve shutting down the machine, putting up an accident guard (blocking a blade or spinning or otherwise dangerous machine element), slowing down the machine to a more safer operation speed, replacing a faulty sensor (putting out incorrect data) with another replacement sensor, replacing a faulty server with another replacement server, replacing a faulty memory device, opening or closing a valve (the former, e.g., to provide fire protection services, the latter, e.g., to prevent an overpressure or otherwise undesirable condition) and so forth. The preceding actions are merely illustrative.

Figure 4:
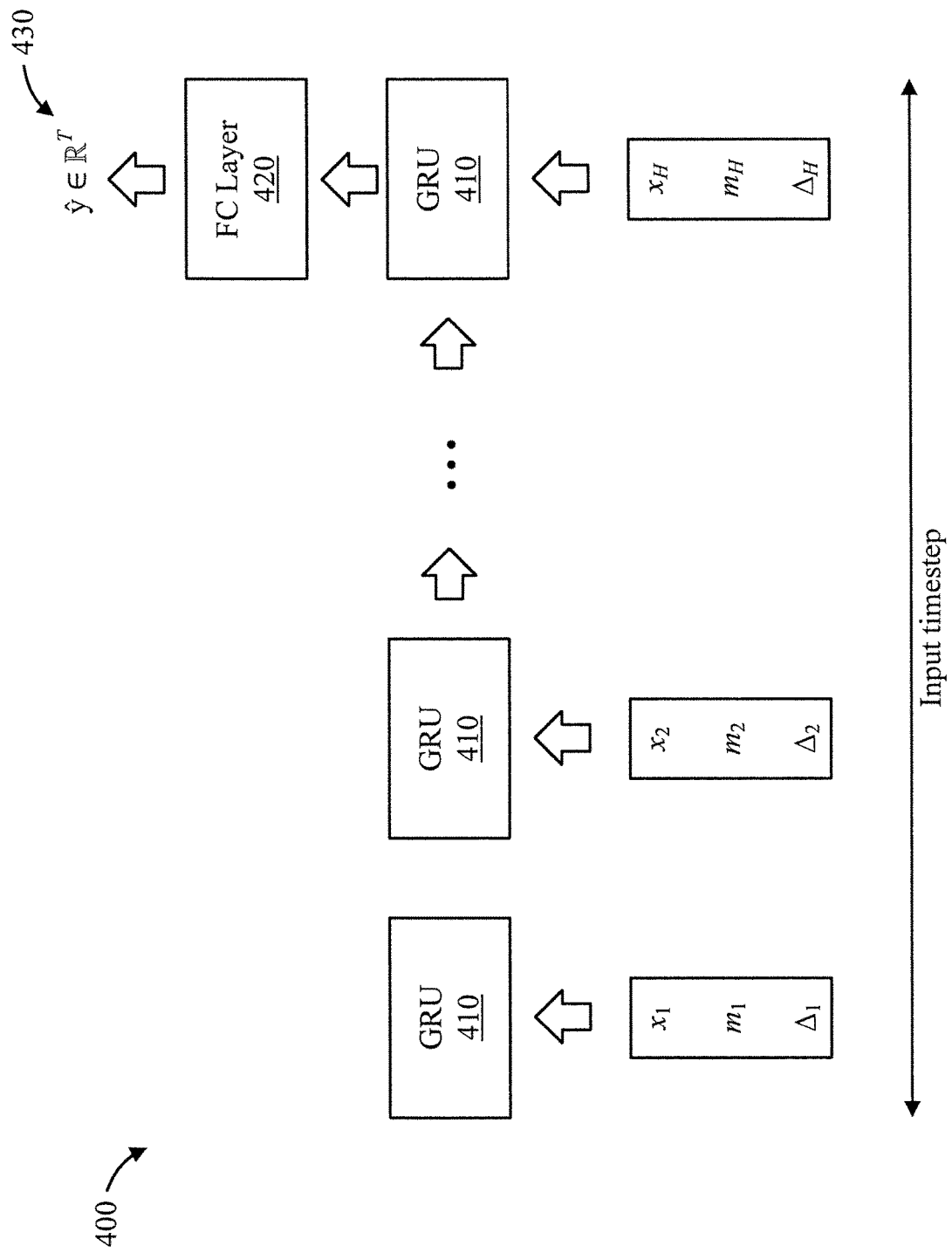
FIG. 4 is a block diagram showing an exemplary Neural Network (NN) model architecture, in accordance with an embodiment of the present invention.

FIG. 4 is a block diagram showing an exemplary Neural Network (NN) model architecture 400, in accordance with an embodiment of the present invention.

The NN model architecture 400 includes multiple Gated Recurrent Units (GRUs) 410 and a Fully-Connected (FC) layer 420 (i.e., a neural network layer where all the inputs are connected to every activation unit). The NN model architecture 400 generates predictions 430 for the data values at future time steps or target labels.

Each of the GRUs 410 is a neural network that receives a triplet encoding that includes a data value $x_i$, a mask value $m_i$, and a (temporal) delta value $\Delta_i$. The temporal delta value is computed as the timestamp difference between the current missing value and a last present value.

In an embodiment, present values are encoded by a "1", system missing values are encoded by a "−1", and random missing values are encoded by a "0". Of course, other values can be used, as long as they are used consistently, as readily appreciated by one of ordinary skill in the art.

In an embodiment, the hidden size of a last GRU 410 is 256 and the hidden size of the FC layer 420 is 16. Of course, other hidden sizes can also be used, while maintaining the spirit of the present invention.

The NN model architecture 400 is configured such that each GRU receives a triplet encoding as input and also such that an output of the first GRU is fed to an input of a second GRU, and so on, until the output of the final GRU is fed to the FC layer 420. The FC layer 420 provides an output prediction $\hat{y} \in \mathcal{R}^T$ 430, where $\hat{y}$ denotes the predicted values from the model, $\mathcal{R}$ denotes set of real numbers, and T denotes an output horizon where T=1, 2, 4, 8. In another embodiment, $\hat{y}$ can be target labels in a classification task.

In operation, each GRU 410 is computed by first calculating the update vector, $z_t = \sigma_g(W_z x_t + U_z h_{t-1} + b_z)$, where $\sigma_g$ is the sigmoid function, $x_t$ is the input feature vector at time step t, $W_z$ denotes the weight vectors with respect to the input feature vector at time t, $U_z$ is the corresponding weight vectors corresponding to the output vector $h_{t-1}$ at time step t−1, $b_z$ is the bias value with respect to the hidden weights of the update vector. Subsequently, the reset gate vector is also computed at time step t, $r_t = \sigma_g(W_r x_t + U_r h_{t-1} + b_r)$, where $W_r$, $U_r$, and $b_r$ correspond to the weight vectors and bias value with respect to the reset gate vector. Given the values computed from the previous step, the candidate activation vector is computed at time step t, defined as $\hat{h}_t = \phi_h(W_h x_t + U_h(r_t \odot h_{t-1}) + b_h)$, where $\phi_h$ denotes the hyperbolic tangent function, $W_h$, $U_h$ and $b_h$ correspond to the weight vectors and bias values with respect to the candidate activation vector, and $\odot$ indicates the Hadamard product operator. The output vector at time step t, $h_t = (1 - z_t) \odot h_{t-1} + z_t \odot \hat{h}_t$ is then computed.

In operation, given the last output vector obtained from the GRU network, the FC layer 420 computes the output prediction $\hat{y} = W h_t + b$, where W and b correspond to the weights and biases in the FC layer. In another embodiment, the FC layer can have sigmoid activation for binary classification or softmax activation for multiclassification task.

It is to be appreciated that while GRUs are described in the illustrative embodiment of FIG. 4, other types of neural networks can be used, including, but not limited to, for example, Long Short-Term Memories (LSTMs).

A description will now be given of an example prediction of multivariate time series with systematic and random missing values, in accordance with an embodiment of the present invention.

Initially, a data preparation step is performed to generate a simulated dataset. The data preparation step is described with respect to FIGS. 5-7.

Figure 5:
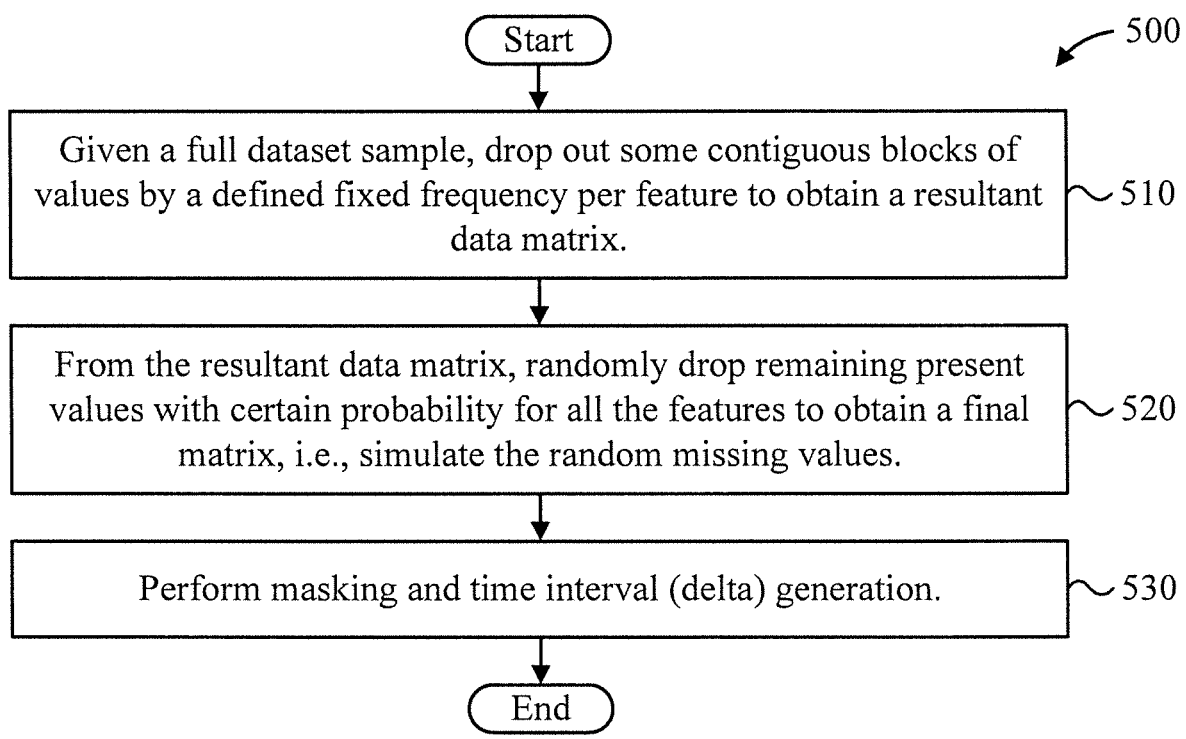
FIG. 5 is a flow diagram showing an exemplary dataset preparation method, in accordance with an embodiment of the present invention.

FIG. 5 is a flow diagram showing an exemplary dataset preparation method 500, in accordance with an embodiment of the present invention.

Figure 6:
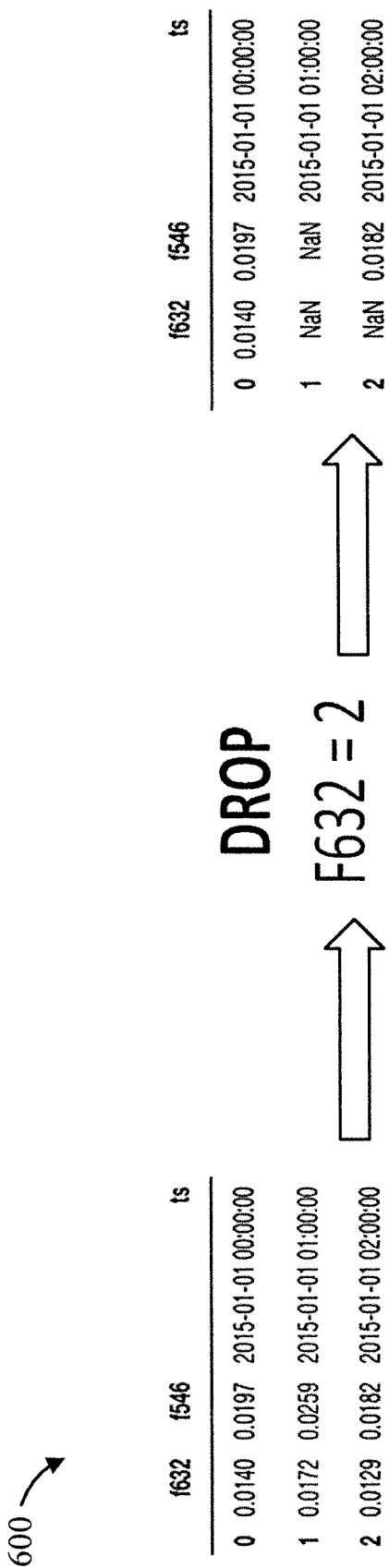
FIG. 6 is a block diagram showing an exemplary full dataset converted to a resultant data matrix with simulated systematic missing values, in accordance with an embodiment of the present invention.

FIG. 6 is a block diagram showing an exemplary full dataset 600 converted to a resultant data matrix 610 with simulated systematic missing values, in accordance with an embodiment of the present invention.

Figure 7:
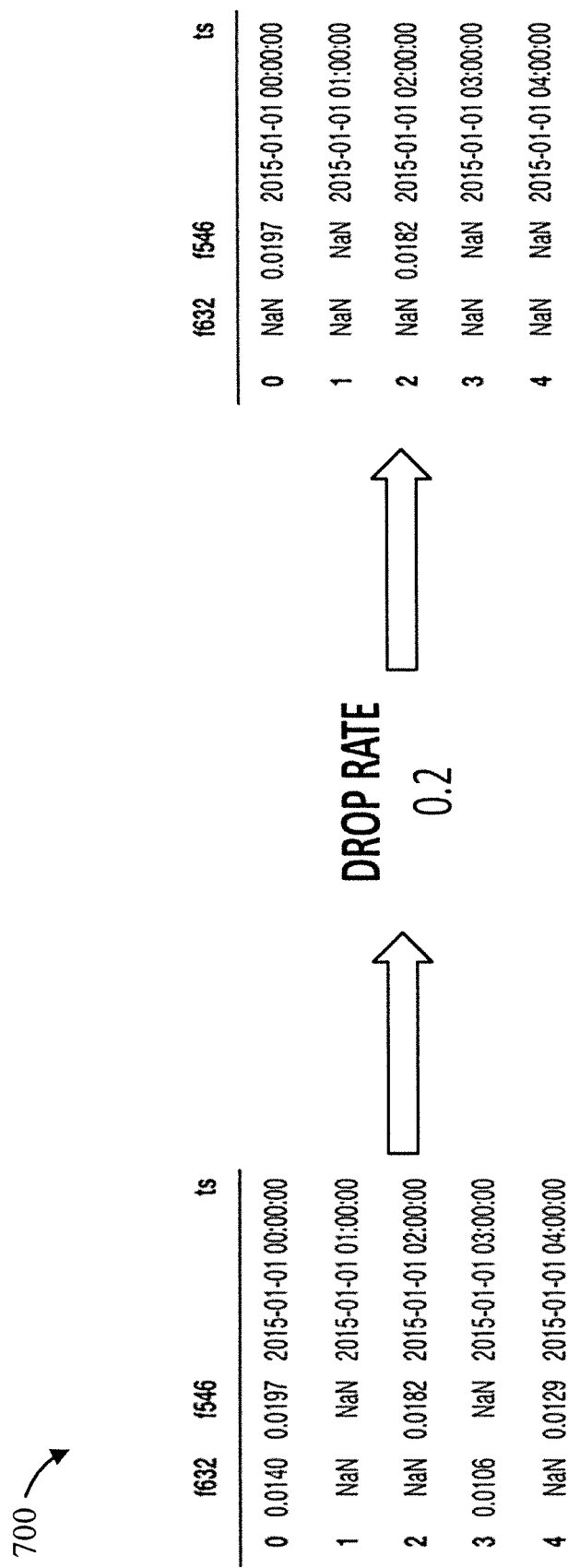
FIG. 7 is a block diagram showing the exemplary resultant data matrix of FIG. 6 converted to a final matrix with both simulated systematic and random missing values, in accordance with an embodiment of the present invention.

FIG. 7 is a block diagram showing the exemplary resultant data matrix 610 of FIG. 6 converted to a final matrix 720 with both simulated systematic and random missing values, in accordance with an embodiment of the present invention.

At block 510, given a full dataset sample, drop out some contiguous blocks of values by a defined fixed frequency per feature to obtain a resultant data matrix, i.e., simulate the systematic missing values.

At block 520, from the resultant data matrix, randomly drop remaining present values with certain probability for all the features to obtain a final matrix, i.e., simulate the random missing values. For example, if drop rate=0.2, the remaining present values of all the features have 0.2 probability of being dropped.

At block 530, perform masking and time interval (delta) generation.

FIG. 8 is a block diagram showing an exemplary dataset 800 resulting from masking and time interval (delta) generation, in accordance with an embodiment of the present invention.

The resultant dataset 800 is used to train the GRUs 410 in FIG. 4, as described above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
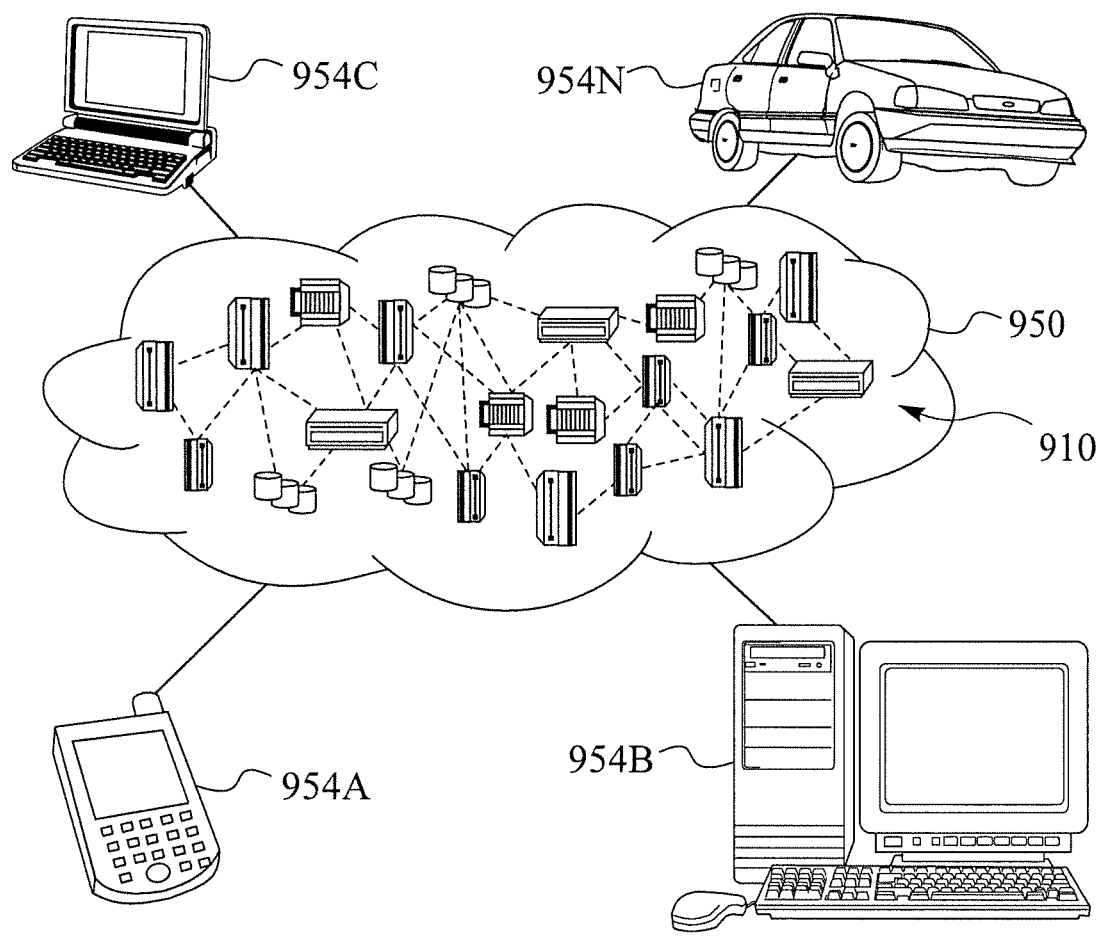
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
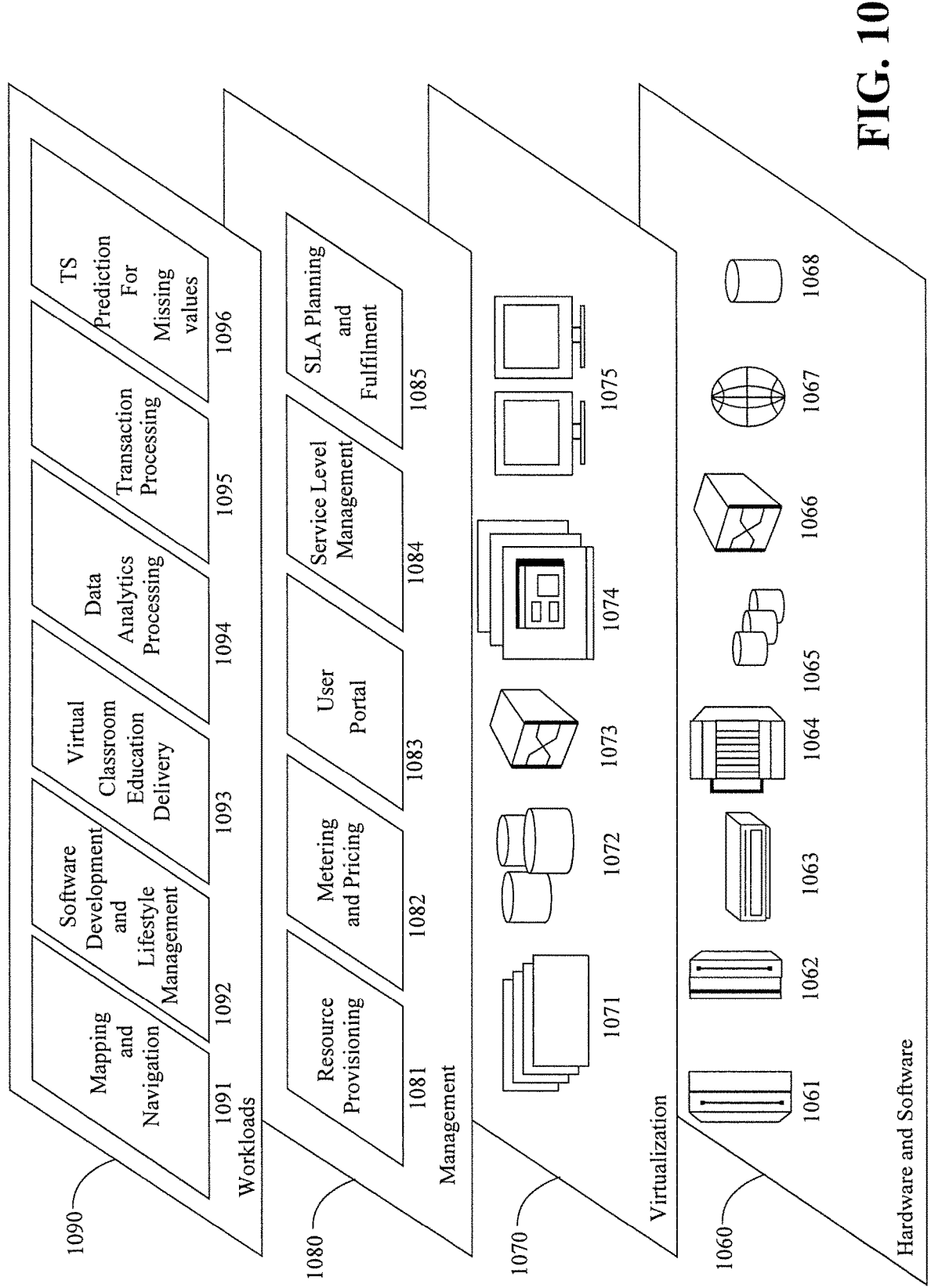
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 884 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and Time Series (TS) prediction for systematic and random values 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for predicting future data values or target labels of multivariate time series data, comprising:
   receiving the multivariate time series data having present values, systematic missing values, and random missing values;
   masking the present values, the systematic missing values, and the random missing values using triplet encodings;
   determining time intervals between current missing values, from among the systematic missing values and the random missing values, and immediately preceding ones of the present values;
   training, by a computing device, at least one recurrent neural network (RNN) with the triplet encodings, the time intervals, and multivariate time series data by feeding feature vectors, derived from the masking and the time intervals, into the RNN to perform a feedforward pass on the recurrent neural network predicting the future data values and the target labels by performing a feedforward pass on the RNN, calculating a loss by comparing results of the predicting with actual values, and adjusting model parameters of the RNN based on the loss to improve prediction accuracy, where a forward imputation is utilized by the computing device to impute any of the current missing values; and
   deploying the trained RNN in a real-time control system to automatically adjust operations of a hardware machine based on the predicted future values and target labels responsive to changes in operational conditions detected through the multivariate time series data.

2. The computer-implemented method of claim 1, wherein the present values, the systematic missing values, and the random missing values for the triplet encodings are selected from the group consisting of −1, 0, and 1.

3. The computer-implemented method of claim 2, wherein the present values are encoded to 1, the systematic missing values are encoded to −1, and the random missing values are encoded to 0.

4. The computer-implemented method of claim 1, wherein the at least one recurrent neural network is a gated recurrent neural network.

5. The computer-implemented method of claim 1, wherein predictions of the future data values or the target labels are output from a fully-connected layer connected to the at least one recurrent neural network.

6. The computer-implemented method of claim 1, wherein mask values and the time intervals are explicitly calculated, and the future data values or the target labels are predicted.

7. The computer-implemented method of claim 1, wherein the systematic missing values are determined by aligning each of the multivariate time series based on a smallest time granularity of an entire dataset or using domain knowledge.

8. The computer-implemented method of claim 1, further comprising performing an action responsive to a prediction of the future data values or the target labels, wherein the action is selected from the group consisting of shutting down a machine, engaging a protective guard, slowing down the machine to a safer operating speed, opening a valve, replacing a faulty server, replacing a faulty memory device, and closing a valve.

9. The method of claim 1, wherein predicted values from the recurrent neural network and ground truth values are used to compute gradients of a loss function from which model parameters are updated using a gradient descent and backpropagation method.

10. A computer program product for predicting future values or target labels of multivariate time series data, the computer program product comprising a non-transitory computer readable storage medium having program instructions embodied therewith, the program instructions executable by a computer to cause the computer to perform a method comprising:
    receiving the multivariate time series data having present values, systematic missing values, and random missing values;
    masking the present values, the systematic missing values, and the random missing values using triplet encodings;
    determining time intervals between current missing values, from among the systematic missing values and the random missing values, and immediately preceding ones of the present values; and
    training, by a computing device, at least one recurrent neural network (RNN) with the triplet encodings, the time intervals, and multivariate time series data by feeding feature vectors, derived from the masking and the time intervals, into the RNN to perform a feedforward pass on the recurrent neural network predicting the future data values and the target labels by performing a feedforward pass on the RNN, calculating a loss by comparing results of the predicting with actual values, and adjusting model parameters of the RNN based on the loss to improve prediction accuracy, where a forward imputation is utilized by the computing device to impute any of the current missing values; and
    deploying the trained RNN in a real-time control system to automatically adjust operations of a hardware machine based on the predicted future values and target labels responsive to changes in operational conditions detected through the multivariate time series data.

11. The computer program product of claim 10, wherein the present values, the systematic missing values, and the random missing values for the triplet encodings are selected from the group consisting of −1, 0, and 1.

12. The computer program product of claim 11, wherein the present values are encoded to 1, the systematic missing values are encoded to −1, and the random missing values are encoded to 0.

13. The computer program product of claim 10, wherein the at least one recurrent neural network is a gated recurrent neural network.

14. The computer program product of claim 10, wherein predictions of the future data values or the target labels are output from a fully-connected layer connected to the at least one recurrent neural network.

15. The computer program product of claim 10, wherein mask values and the time intervals are explicitly calculated, and the future values or the target labels are predicted.

16. The computer program product of claim 10, wherein the systematic missing values are determined by aligning each of the multivariate time series based on a smallest time granularity of an entire dataset or using domain knowledge.

17. A computer processing system for predicting future values or target labels of multivariate time series data, comprising:
   a memory device for storing program code; and
   a processor device operatively coupled to the memory device for running the program code to
   receive the multivariate time series data having present values, systematic missing values, and random missing values;
   mask the present values, the systematic missing values, and the random missing values using triplet encodings;
   determine time intervals between current missing values, from among the systematic missing values and the random missing values, and immediately preceding ones of the present values; and
   train at least one recurrent neural network (RNN) with the triplet encodings, the time intervals, and multivariate time series data by feeding feature vectors, derived from the masking and the time intervals, into the RNN to perform a feedforward pass on the recurrent neural network predicting the future data values and the target labels by performing a feedforward pass on the RNN, calculating a loss by comparing results of the predicting with actual values, and adjusting model parameters of the RNN based on the loss to improve prediction accuracy, where a forward imputation is utilized by the computing device to impute any of the current missing values; and
   deploying the trained RNN in a real-time control system to automatically adjust operations of a hardware machine based on the predicted future values and target labels responsive to changes in operational conditions detected through the multivariate time series data.

18. The computer processing system of claim 17, wherein the present values, the systematic missing values, and the random missing values for the triplet encodings are selected from the group consisting of −1, 0, and 1.

* * * * *